United States Patent
Satongar et al.

(10) Patent No.: US 10,278,003 B2
(45) Date of Patent: Apr. 30, 2019

(54) COORDINATED TRACKING FOR BINAURAL AUDIO RENDERING

(71) Applicant: Apple Inc., Cupertino, CA (US)

(72) Inventors: Darius A. Satongar, Santa Clara, CA (US); Afrooz Family, Emerald Hills, CA (US); Sylvain J. Choisel, San Francisco, CA (US); Juha O. Merimaa, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/465,540

(22) Filed: Mar. 21, 2017

(65) Prior Publication Data

US 2018/0091922 A1 Mar. 29, 2018

Related U.S. Application Data

(60) Provisional application No. 62/399,250, filed on Sep. 23, 2016.

(51) Int. Cl.
*H04S 7/00* (2006.01)
*G06F 3/01* (2006.01)
(Continued)

(52) U.S. Cl.
CPC ............. *H04S 7/304* (2013.01); *G06F 3/012* (2013.01); *H04R 5/033* (2013.01); *H04R 5/04* (2013.01);
(Continued)

(58) Field of Classification Search
CPC .. H04R 5/033; H04S 2400/11; H04S 2420/01
(Continued)

(56) References Cited

U.S. PATENT DOCUMENTS 5,373,857 A * 12/1994 Travers ................. G01C 17/30
600/595
6,532,291 B1 3/2003 McGrath
(Continued)

OTHER PUBLICATIONS

PCT International Search Report and Written Opinion for PCT International Appln No. PCT/US2017/047592 dated Nov. 13, 2017. (90 pages).
(Continued)

*Primary Examiner* — Alexander Jamal
(74) *Attorney, Agent, or Firm* — Womble Bond Dickinson (US) LLP

(57) ABSTRACT

A binaural sound reproduction system, and methods of using the binaural sound reproduction system to dynamically re-center a frame of reference for a virtual sound source, are described. The binaural sound reproduction system may include a reference device, e.g., a mobile device, having a reference sensor to provide reference orientation data corresponding to a direction of the reference device, and a head-mounted device, e.g., headphones, having a device sensor to provide device orientation data corresponding to a direction of the head-mounted device. The system may use the reference orientation data to determine whether the head-mounted device is being used in a static or dynamic use case, and may adjust an audio output to render the virtual sound source in an adjusted source direction based on the determined use case. Other embodiments are also described and claimed.

20 Claims, 13 Drawing Sheets

(51) Int. Cl.
*H04R 5/033* (2006.01)
*H04R 5/04* (2006.01)

(52) U.S. Cl.
CPC ...... *H04R 2420/07* (2013.01); *H04R 2460/07* (2013.01); *H04S 2400/01* (2013.01); *H04S 2400/11* (2013.01); *H04S 2420/01* (2013.01)

(58) Field of Classification Search
USPC .......................................... 381/303, 309, 310
See application file for complete search history.

(56) References Cited

U.S. PATENT DOCUMENTS

| | | | |
|---|---|---|---|
| 7,333,622 | B2 | 2/2008 | Algazi |
| 7,876,903 | B2 | 1/2011 | Sauk |
| 8,175,286 | B2 | 5/2012 | Bech et al. |
| 9,792,926 | B2 * | 10/2017 | Boemer ................. H04B 15/02 |
| 2008/0056517 | A1 | 3/2008 | Algazi et al. |
| 2011/0293129 | A1 * | 12/2011 | Dillen ..................... H04S 7/304 |
| | | | 381/370 |
| 2013/0177187 | A1 | 7/2013 | Mentz |
| 2014/0153751 | A1 | 6/2014 | Wells |
| 2014/0347390 | A1 | 11/2014 | Poulos et al. |
| 2014/0375531 | A1 * | 12/2014 | Latypov ............. G02B 27/0172 |
| | | | 345/8 |
| 2016/0021541 | A1 * | 1/2016 | Haddad .................. G06F 21/50 |
| | | | 713/164 |
| 2016/0134987 | A1 | 5/2016 | Gorzel et al. |
| 2016/0134988 | A1 | 5/2016 | Gorzel et al. |
| 2017/0188168 | A1 * | 6/2017 | Lyren ...................... H04S 1/007 |
| 2017/0245065 | A1 * | 8/2017 | Suhami ................ H04R 25/505 |
| 2017/0344337 | A1 * | 11/2017 | Kabatek .................. G06F 3/165 |

OTHER PUBLICATIONS

Hugh Robjohns, "Mixing on Headphones What to Use & How to Do It", https://web.archive.org/web/20150810162528/http://www.soundonsound.com/sos/dec03/articles/mixingheadphones.htm, Dec. 2003, four pages, SOS Sound on Sound.

* cited by examiner

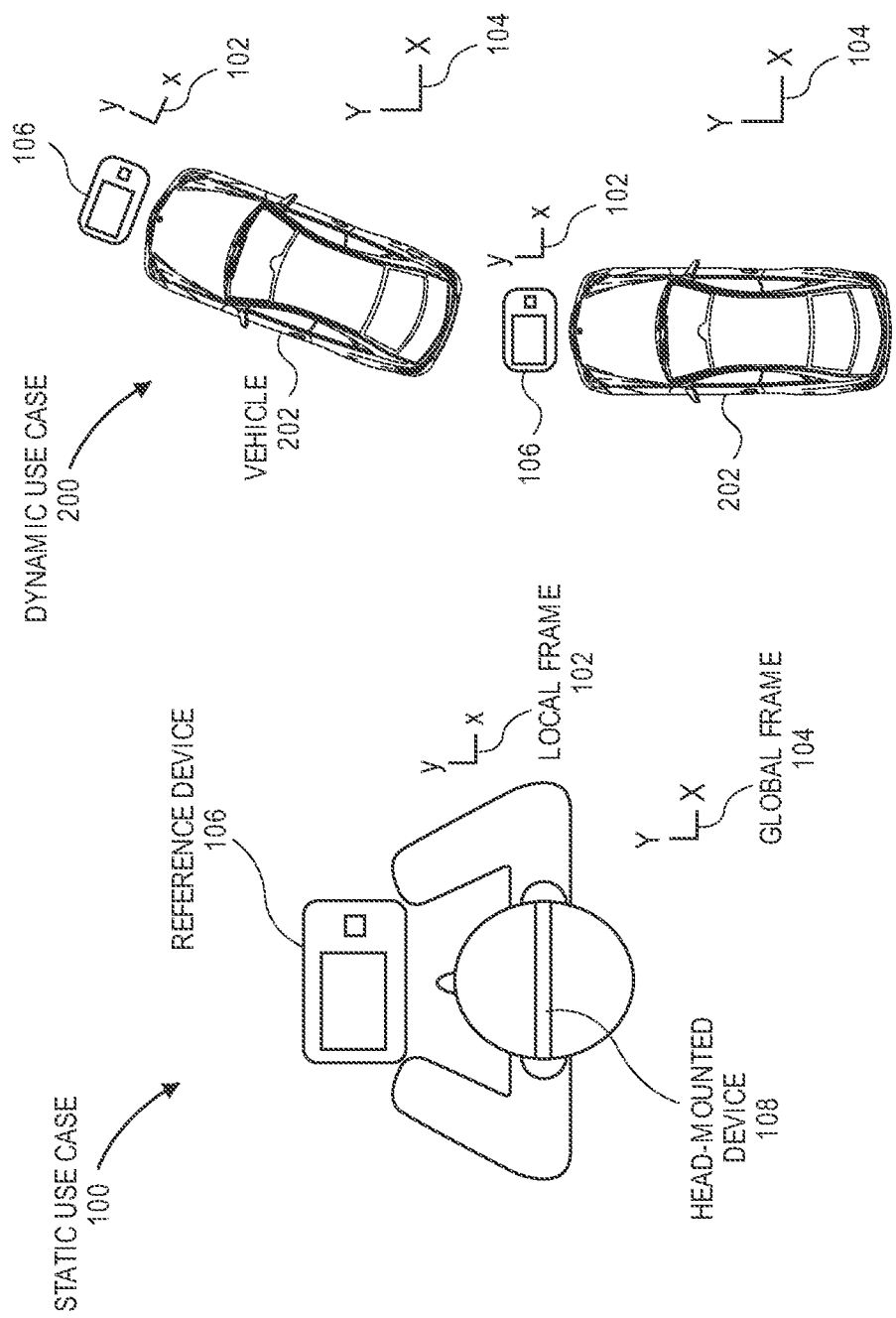

COORDINATED TRACKING FOR BINAURAL AUDIO RENDERING

This application claims the benefit of priority of U.S. Provisional Patent Application No. 62/399,250, filed Sep. 23, 2016, and incorporates herein by reference that provisional patent application.

BACKGROUND

Field

Embodiments related to binaural sound reproduction systems are disclosed. More particularly, embodiments related to binaural sound reproduction systems having head-mounted devices in communication with electronic devices, are disclosed.

Background Information

Binaural headphones simulate virtual sound sources. To achieve realistic virtual sound sources, head-tracking may be used to anchor the virtual sound source to a reference frame, e.g., a room. Head-tracking systems may incorporate orientation sensors to allow an audio engine to predict an orientation of the binaural headphones relative to the reference frame, and thus, to simulate the virtual sound source in an appropriate direction as a listener's head turns.

SUMMARY

Existing binaural headphones having head-tracking can achieve realistic virtual sound sources when the reference frame is not moving. That is, current binaural headphones assume that the virtual sound source is spatially anchored to a stationary reference frame, and thus, movements of the head-tracker are attributed to the listener's head turning. Such an assumption may not be appropriate, however, when the reference frame is a moving frame of reference or when the listener's entire body is moving relative to the forward-facing direction. For example, the assumption may be incorrect when the listener is jogging along winding city streets or when the listener is traveling in a cabin of a car or an airplane. When the reference frame and the head of the user experience similar motion, e.g., when an airplane yaws rightward from an old heading to a new heading and causes a passenger's head to also turn rightward, a realistic virtual sound source should be positioned in a same direction relative to the new heading rather than remain fixed relative to the old heading. It will be appreciated that this does not occur in existing binaural headphones because the movement imparted to the head-tracker from the turning plane will result in a shift of the virtual sound source in a leftward direction, as perceived by the listener, even when there is no orientation change between the listener's head and the moving cabin.

In an embodiment, a binaural sound reproduction system performs a method to dynamically re-center a frame of reference for a virtual sound source. The binaural sound reproduction system includes a reference device having a reference sensor to output reference orientation data, and a head-mounted device having a device sensor to output device orientation data. The reference orientation data corresponds to a reference direction of the reference device, and the device orientation data corresponds to a device direction of the head-mounted device. Accordingly, the binaural sound reproduction system is provided with system orientation data that may be used to re-center a frame of reference of the head-mounted device.

In one embodiment, the head-mounted device includes an audio processor configured to output an audio output to render a virtual sound source in a source direction at an offset angle from a forward-facing device direction. Accordingly, a user of the head-mounted device may perceive the virtual sound source as coming from the source direction. The virtual sound source may be dynamically shifted according to a use case of the head-mounted device. More particularly, the audio output may be adjusted based on a determined use case. Accordingly, the audio processor may be configured to determine, based on the reference orientation data, whether the head-mounted device is in a static use case, e.g., when a reference angular change of the reference direction is within a predetermined range of motion, or a dynamic use case, e.g., when the reference angular change is outside of the predetermined range of motion.

In an embodiment, when the head-mounted device is in a static use case, a frame of reference of the head-mounted device is manually re-centered. For example, the head-mounted device may include a re-centering input switch to receive a re-centering input from a user. The audio processor may adjust the audio output in response to receiving the re-centering input, e.g., in response to the user pressing a physical button, to re-center the frame of reference of the head-mounted device. More particularly, the audio processor may render the virtual sound source in an adjusted source direction at an offset angle from a current forward-facing device direction. The offset angle may be a same angle that the virtual sound source was previously offset from an initial forward-facing device direction before the user turned his head. Accordingly, the virtual sound source may be manually shifted by the user in the static use case.

In an embodiment, when head-mounted device is in a dynamic use case, a frame of reference of head-mounted device is automatically re-centered according to a dynamic time constant. To implement the automatic re-centering, audio processor may determine an amount of a device angular change of a device direction of the head-mounted device, e.g., a degree to which a user's head rotates. When the amount of the device angular change is greater than a predetermined angular change threshold, the audio processor may determine a rate of the device angular change. The rate may be determined over a predetermined duration. For example, the predetermined duration may be inversely proportional to the amount of the device angular change. That is, the predetermined duration may be greater when the amount of device angular change is smaller. In one embodiment, when the determined rate is less than a predetermined rate threshold (indicating that the user is now facing a new forward-facing direction) the audio processor may adjust the audio output to render the virtual sound source in an adjusted source direction. The adjusted source direction may be offset from the original source direction by the amount of device angular change. Accordingly, automatic re-centering of the frame of reference of the head-mounted device based on movement of the head-mounted device may maintain the user's perception of the virtual sound source as coming from a same direction.

In an embodiment, when head-mounted device is in a dynamic use case, a frame of reference of head-mounted device is automatically re-centered based on movement of the reference device. To implement the automatic re-centering, audio processor may determine an amount of a reference angular change of a reference direction of the reference device, e.g., when the reference device rotates as a result of the user jogging or driving around a corner. The audio processor may adjust the audio output to render the virtual sound source in an adjusted source direction. In one embodiment, the adjusted source direction is offset from the original source direction by the amount of the reference angular change. Accordingly, re-centering of the frame of reference of the head-mounted device is based on movement of the reference device. The coordinated re-centering may maintain the user's perception of the virtual sound source as coming from a same direction.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

FIG. 1 is a pictorial view of a user consuming audio or video content in a static use case, in accordance with an embodiment.

FIG. 2 is a pictorial view of a user consuming audio or video content in a dynamic use case, in accordance with an embodiment.

DETAILED DESCRIPTION

Figure 3:
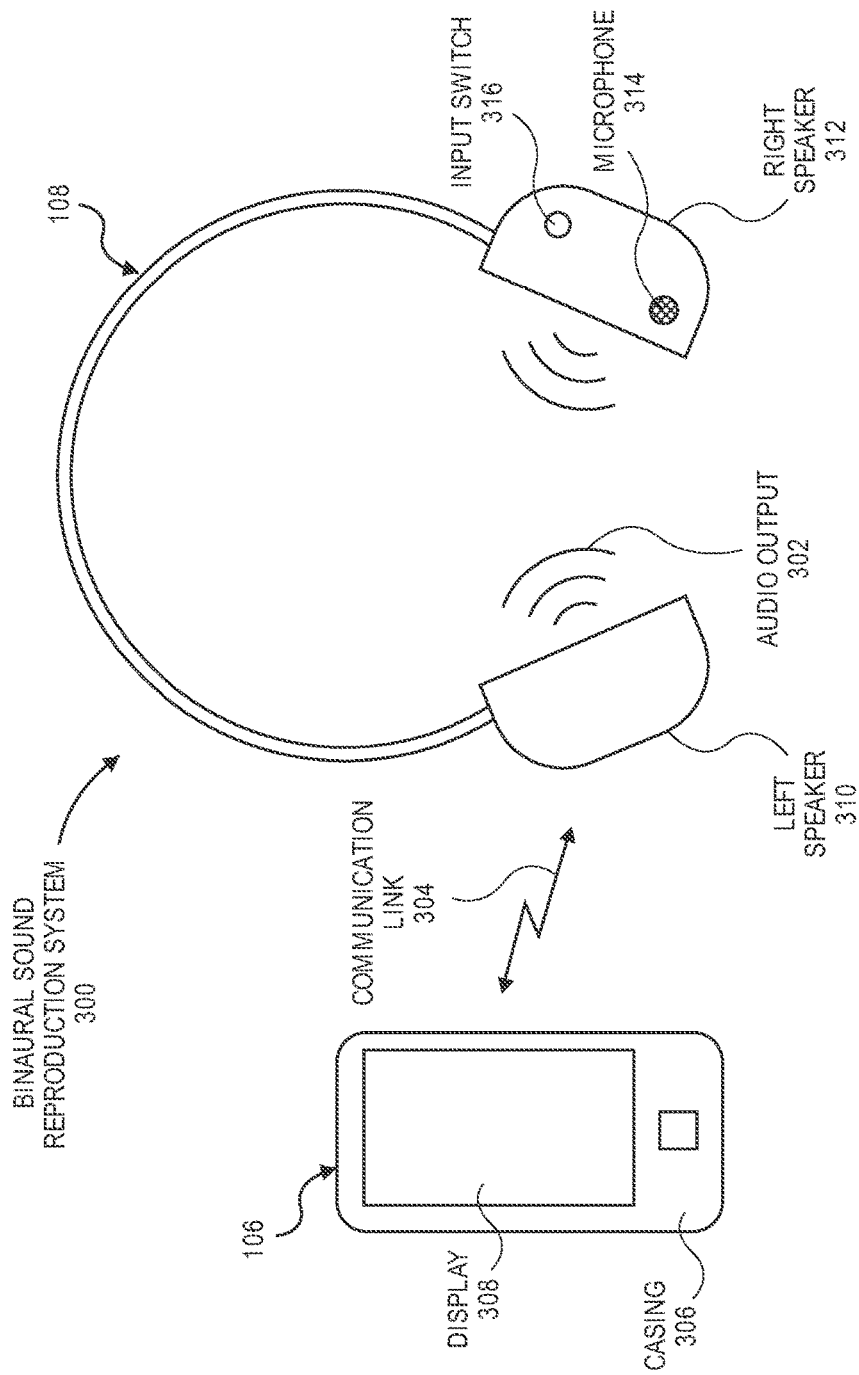
FIG. 3 is a pictorial view of a binaural sound reproduction system, in accordance with an embodiment.

Embodiments describe a binaural sound reproduction system, and methods of using the binaural sound reproduction system to dynamically re-center a frame of reference for a virtual sound source. The binaural sound reproduction system may include a reference device, such as a laptop computer, a tablet computer, a mobile device, or a wearable computer, and a head-mounted device, such as a headset or headphones. The binaural sound reproduction system may, however, incorporate other devices and apparatuses. For example, the head-mounted device may be a non-head-mounted device, e.g., the device may be a speaker system of a motor vehicle synced to a computer worn by a user. Likewise, the reference device may be an on-board computer of a motor vehicle.

In various embodiments, description is made with reference to the figures. However, certain embodiments may be practiced without one or more of these specific details, or in combination with other known methods and configurations. In the following description, numerous specific details are set forth, such as specific configurations, dimensions, and processes, in order to provide a thorough understanding of the embodiments. In other instances, well-known processes and manufacturing techniques have not been described in particular detail in order to not unnecessarily obscure the description. Reference throughout this specification to "one embodiment," "an embodiment," or the like, means that a particular feature, structure, configuration, or characteristic described is included in at least one embodiment. Thus, the appearance of the phrase "one embodiment," "an embodiment," or the like, in various places throughout this specification are not necessarily referring to the same embodiment. Furthermore, the particular features, structures, configurations, or characteristics may be combined in any suitable manner in one or more embodiments.

The use of relative terms throughout the description may denote a relative position or direction. For example, "clockwise" may indicate a first rotational direction about a reference point. Similarly, "counterclockwise" may indicate a second rotational direction opposite to the first rotation direction. Such terms are provided to establish relative frames of reference, however, and are not intended to limit the use or orientation of a binaural sound reproduction system to a specific configuration described in the various embodiments below.

In an aspect, a binaural sound reproduction system includes a head-mounted device to output audio that renders a virtual sound source in a source direction, and a secondary reference device that remains fixed relative to a frame of reference of the virtual sound source. For example, the secondary device may be on a torso of a jogging listener, or a mobile device or laptop computer resting on a console or tray of a moving automobile or airplane. Thus, the secondary device may have a reference direction that is a current orientation direction relative to some reference. For example, the reference direction may be a forward-facing direction, e.g., a direction that the listener is running or a direction that the automobile or airplane is travelling. Orientation data from the secondary device may be used to determine whether the head-mounted device is being used in a static or dynamic use case. Accordingly, movements of the head-mounted device may be differentiated against movements of the secondary device based on the particular use case to adjust the audio output in a manner that realistically locates the virtual sound source as expected by the listener. That is, the virtual sound source may be positioned relative to the frame of reference that the listener is listening within, as determined by the reference device, and local head movements can give auditory cues to achieve externalization and localization of the virtual sound source in the audio rendering.

Referring to FIG. 1, a pictorial view of a user consuming audio or video content in a static use case is shown in accordance with an embodiment. A static use case 100 may be a case in which a local frame of reference 102 associated with a user is stationary with respect to a global frame of reference 104. Global frame of reference 104 may, for example, be the surface of the earth beneath the user. In such case, a reference device 106, such as a mobile device, tablet computer, or a laptop computer resting on a desk in front of the user, may remain fixed relative to local frame of reference 102 and global frame of reference 104. Similarly, a torso of the user may remain fixed relative to local frame of reference 102 and global frame of reference 104. Accordingly, movement of a head-mounted device 108 being worn by the user may be attributed to the user turning his head rather than being attributed to local frame of reference 102 turning relative to global frame of reference 104.

Referring to FIG. 2, a pictorial view of a user consuming audio or video content in a dynamic use case is shown in accordance with an embodiment. A dynamic use case 200 may be a case in which local frame of reference 102 associated with a user moves with respect to global frame of reference 104. The user may be sitting in a seat of a moving vehicle 202. In such case, reference device 106 may be resting on a console of vehicle 202, and thus, reference device 106 may remain fixed relative to local frame of reference 102. Similarly, the torso of the user may remain fixed relative to local frame of reference 102. Local frame of reference 102, however, may move relative to global frame of reference 104 when vehicle 202 changes directions. For example, when vehicle 202 is steered right, local frame of reference 102 turns right relative to global frame of reference 104. As such, reference device 106 or the torso of the user, which may be fixed to the moving local frame of reference 102, may also turn relative to global frame of reference 104.

Whether the user is listening to a virtual sound source rendered by head-mounted device 108 in static use case 100 or dynamic use case 200, it is desirable for the virtual sound source to be stable against the user's head motion. That is, head-mounted device 108 should adjust an audio output to render the virtual sound source in an appropriate direction relative to local frame of reference 102. More particularly, it may be desirable to relocate the virtual sound source when the user turns his head, but not when the head turn results from turning the user's torso. An appropriate method of relocating the virtual sound source may, however, depend on the use case. For example, in a static use case 100, when reference device 106 is fixed relative to global frame of reference 104, the user may want to manually re-center a head-tracker when the user wishes to pivot in his chair to change a forward-facing direction from an old direction, e.g., facing reference device 106 on a desk, to a new direction, e.g., looking out a window. By contrast, in a dynamic use case 200, when reference device 106 is moving relative to global frame of reference 104, the user may want to automatically update the forward-facing direction to obviate the need to continually provide manual re-centering inputs each time he jogs or drives around a corner.

Referring to FIG. 3, a pictorial view of a binaural sound reproduction system is shown in accordance with an embodiment. A binaural sound reproduction system 300 may include reference device 106 and head-mounted device 108. Head-mounted device 108 may output audio to render a virtual sound source in a source direction as perceived by a user listening to the audio output 302. As described below, reference device 106 may be a secondary device used to provide orientation data corresponding to a direction or movement of local frame of reference 102. A communication link 304 may be established between reference device 106 and head-mounted device 108 by a wired or wireless connection to communicate audio or orientation data between the devices.

Reference device 106 may be an electronic device such as a smartphone device, a tablet computer, a laptop computer, an on-board computer of an automobile, etc. That is, reference device 106 may be any portable device or apparatus that is movable relative to global frame of reference 104. Reference device 106 may include various capabilities to allow the user to access features involving, for example, calls, voicemail, music, e-mail, internet browsing, scheduling, or photos. Reference device 106 may also include hardware to facilitate such capabilities. For example, a casing 306 may contain an audio speaker, e.g., a microspeaker, to deliver a far-end voice to a near-end user during a call, and a microphone to pick up the voice of the user during the call. A display 308 may present video content associated with audio output 302 to the user. Other conventional features are not shown but may of course be included in reference device 106.

Head-mounted device 108 of binaural sound reproduction system 300 may be adapted to present audio content to the user. For example, head-mounted device 108 may be headphones or a headset having a left speaker 310 and a right speaker 312 to emit audio output 302 as stereo sound to the user. Audio output 302 may be associated with music files played by a music player application running on reference device 106 or a far-end voice of a call being serviced by reference device 106. Head-mounted device 108 may include a microphone 314 to pick up the voice of the user during the call. Microphone 314 may also detect user inputs, such as voice activated commands. Similarly, head-mounted device 108 may include manual input features, such as a re-centering input switch 316 to receive a re-centering input from the user, as described below.

Figure 4:
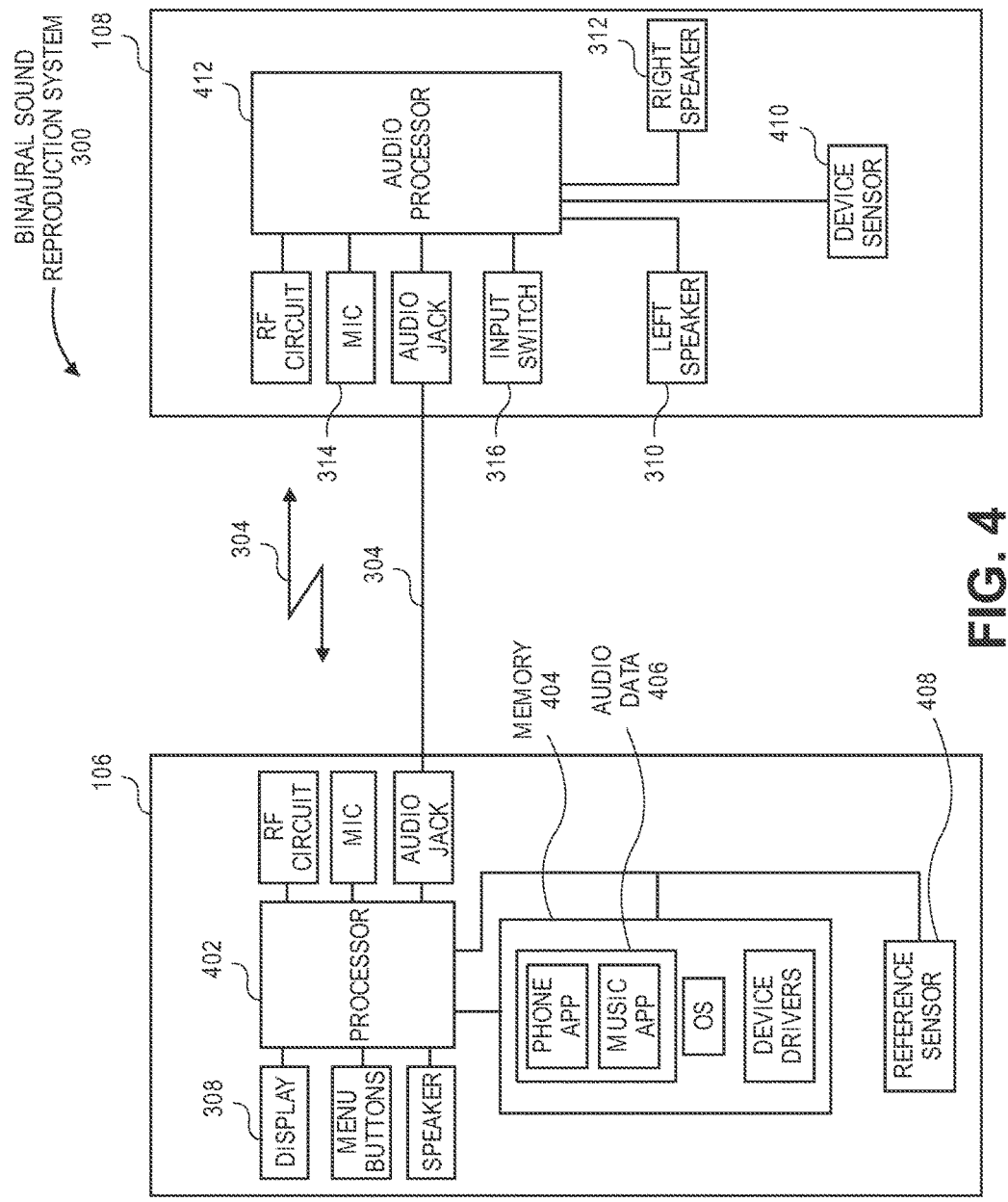
FIG. 4 is a block diagram of a binaural sound reproduction system, in accordance with an embodiment.

Referring to FIG. 4, a block diagram of a binaural sound reproduction system is shown in accordance with an embodiment. Reference device 106 may be any of several types of portable devices or apparatuses with circuitry suited to specific functionality. Accordingly, the diagrammed circuitry is provided by way of example and not limitation. Reference device 106 may include one or more processors 402 to execute instructions to carry out the different functions and capabilities described below. Instructions executed by processor(s) 402 of reference device 106 may be retrieved from a local memory 404, which may include a non-transitory machine-readable medium. The instructions may be in the form of an operating system program having device drivers and/or an audio rendering engine for rendering a virtual sound source according to the methods described below. Processor(s) 402 may also retrieve audio data 406 from memory 404, including audio data associated with phone and/or music play back functions controlled by the telephony or music application programs that run on top of the operating system. To perform such functions, processor(s) 402 may directly or indirectly implement control loops and receive input signals from and/or provide output signals to other electronic components. For example, reference device 106 may receive input signals from orientation devices of binaural sound reproduction system 300 and output audio signals to an audio speaker and/or to head-mounted device 108 via wired or wireless communication link 304. Communication link 304 may include an audio jack connection in an embodiment, however, an audio jack is only one type of possible connector and other wired connectors may be used. Furthermore, in an embodiment, reference device 106 and/or head-mounted device 108 do not include an audio jack and/or a wired connection, and communication link 304 is established only by a wireless connection. Head-mounted device 108 may process the audio signals to render a virtual sound source, as described below.

In an embodiment, the electronic circuitry of reference device 106 includes a reference sensor 408 to output reference orientation data corresponding to a reference direction 702 of reference device 106. The reference orientation data may be served to processor(s) 402 or memory 404, and processor(s) 402 may retrieve the reference orientation data from memory 404. Reference sensor 408 may be one or more of any known orientation sensor, such as accelerometers, magnetometers, gyroscopes, etc. For example, reference sensor 408 may be an inertial measurement unit (IMU) integrated within casing 306 of reference device 106. Such inertial-based examples are not restrictive, however, and reference sensor 408 may include non-inertial sensors, such as optical sensors. More particularly, reference sensor 408 may be an optical sensor of a camera integrated in a robotic mapping system, e.g., simultaneous localization and mapping system. The robotic mapping system may be used to develop and provide reference orientation data corresponding to a reference direction of reference device 106.

Reference sensor 408 may detect additional information relevant to a use case of binaural sound reproduction system 300. For example, reference sensor 408 may include a global positioning system (GPS) sensor to determine whether reference device 106 is in transit, e.g., on a street or a rail line. Similarly, reference sensor 408 may include a microphone to receive ambient sounds that may be comparable to signature sound profiles, e.g., ambient noise from an aircraft engine, to gather further information about a context of the use case.

In an embodiment, head-mounted device 108 includes a device sensor 410 to output device orientation data corresponding to a device direction of head-mounted device 108. Device sensor 410 may be similar to reference sensor 408. For example, device sensor 410 may be an inertial or non-inertial sensor used to detect an orientation of head-mounted device 108. Furthermore, device sensor 410 may detect a context of head-mounted device 108, i.e., information related to a use case of head-mounted device 108.

Head-mounted device 108 may store device orientation data from device sensor 410 in a respective memory (not shown), or the device orientation data may be served directly to an audio processor 412 of head-mounted device 108. Audio processor 412 may be configured to present audio output 302 to the user via left speaker 310 and right speaker 312. More particularly, audio processor 412 may provide audio electrical signals to the speakers such that stereo sound from the speakers renders a virtual sound source in a source direction. Audio data 406 corresponding to audio output 302 may be received by audio processor 412 via wired or wireless communication link 304 from reference device 106. For example, the audio data 406 may correspond to a video playing on display 308 of reference device 106.

Processor(s) 402 of reference device 106 and/or audio processor 412 of head-mounted device 108 may execute an audio rendering algorithm to determine the appropriate audio electrical signals for left speaker 310 and right speaker 312 to render the virtual sound source in the appropriate direction. More particularly, processor(s) 402 or audio processor 412 may determine a use case of binaural sound reproduction system 300 and dynamically re-center a frame of reference of binaural sound reproduction system 300 based on information gathered by reference sensor 408 and/or device sensor 410. Re-centering may be performed manually or automatically by audio processor 412.

Figure 5:
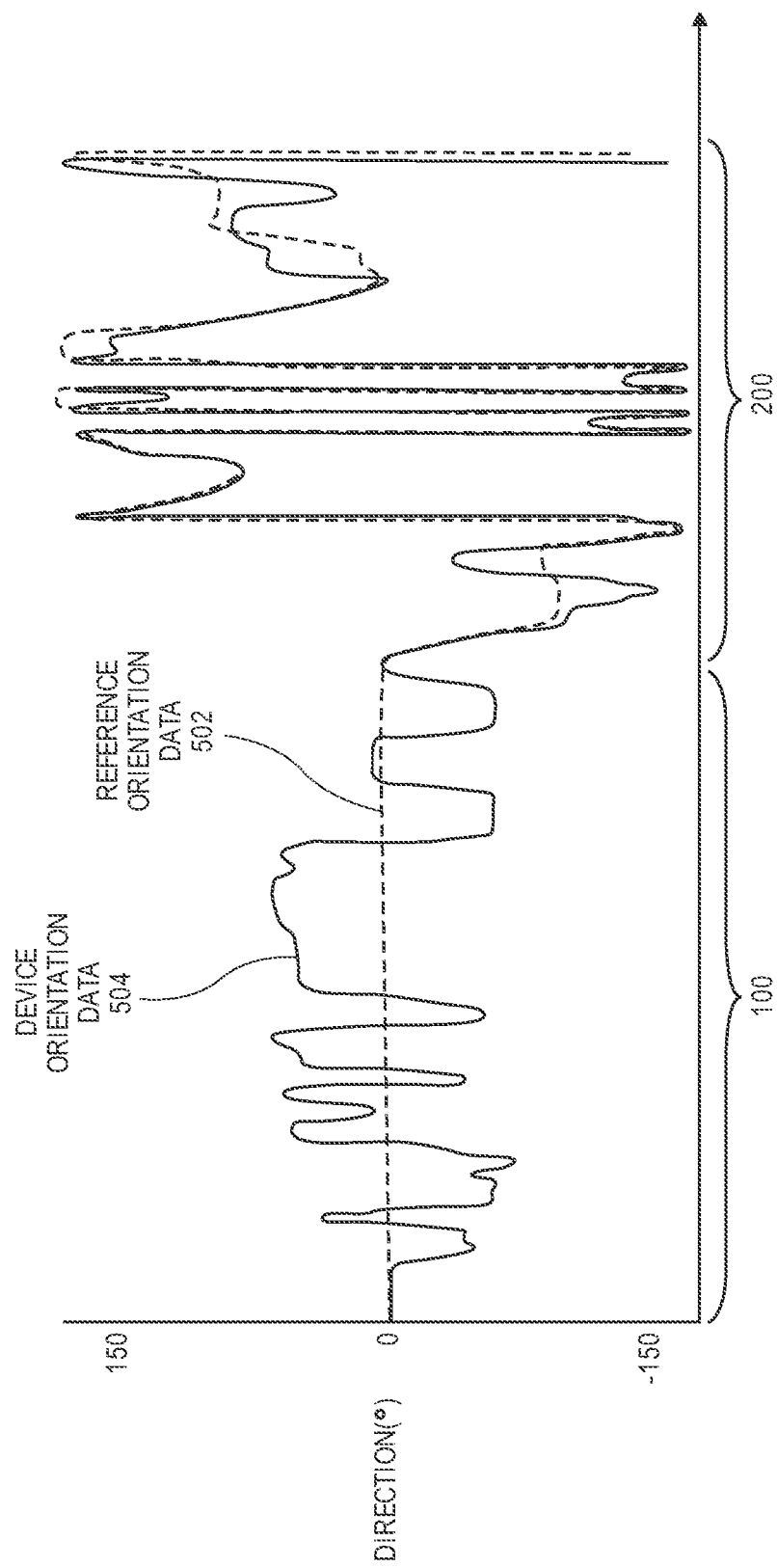
FIG. 5 is a graphical representation of orientation data for a binaural sound reproduction system during a static use case and a dynamic use case, in accordance with an embodiment.

Referring to FIG. 5, a graphical representation of orientation data for a binaural sound reproduction system during a static use case and a dynamic use case is shown in accordance with an embodiment. As described above, reference sensor 408 of reference device 106 may output reference orientation data 502. Reference orientation data 502 may correspond to a rotation of local frame of reference 102. During static use case 100, reference orientation data 502 indicates that reference device 106 is stationary. More particularly, a reference direction of reference device 106, which by convention is initially directed in a zero degree direction relative to global frame of reference 104, remains directed in the zero degree direction. That is, reference device 106 experiences no discernible angular change or rotation in static use case 100. By contrast, during dynamic use case 200, reference orientation data 502 indicates that reference device 106 is not stationary. More particularly, the reference direction of reference device 106 departs from the zero degree direction, and moves relative to global frame of reference 104. That is, reference device 106 experiences an angular change or rotation in dynamic use case 200. Reference orientation data 502 during static use case 100 may be typical of the user sitting in a bus while the bus is parked at a bus stop, and reference orientation data 502 during dynamic use case 200 may be typical of the user sitting in the bus as the bus moves along city streets.

Device sensor 410 of head-mounted device 108 may output device orientation data 504. Device orientation data 504 may correspond to a head azimuth of the user. During static use case 100, device orientation data 504 indicates that head-mounted device 108 moves relative to reference device 106. More particularly, a device direction of head-mounted device 108 changes as the user looks from left to right. More particularly, the device direction of head-mounted device 108 moves relative to both local frame of reference 102 and global frame of reference 104 in static use case 100. Similarly, during dynamic use case 200, device orientation data 504 indicates that head-mounted device 108 moves as the user looks from left to right. Device orientation data 504 during static use case 100 may be typical of the user looking around at other passengers in a bus while the bus is parked at a bus stop, and device orientation data 504 during dynamic use case 200 may be typical of the user looking out of the bus windows as the bus moves along city streets. Accordingly, device orientation data 504 indicates a degree to which the user's head is moving relative to global frame of reference 104, but does not indicate a degree to which the head movement is attributable to movement of the local frame of reference 102 within which the user is situated.

A virtual sound source is rendered to the user such that the user perceives the sound source as being fixed in space. Maintaining the virtual sound source in a position that is expected by a listener, however, may require binaural sound reproduction system 300 to differentiate between movements of the listeners head caused by a rotation of the user's neck, and movements caused by a rotation of the local frame of reference 102 within which the user is situated. Accordingly, to anchor the virtual sound source to local frame of reference 102, binaural sound reproduction system 300 may function to assess a use case and re-center a frame of reference for the virtual sound source based on the determined use case.

Figure 6:
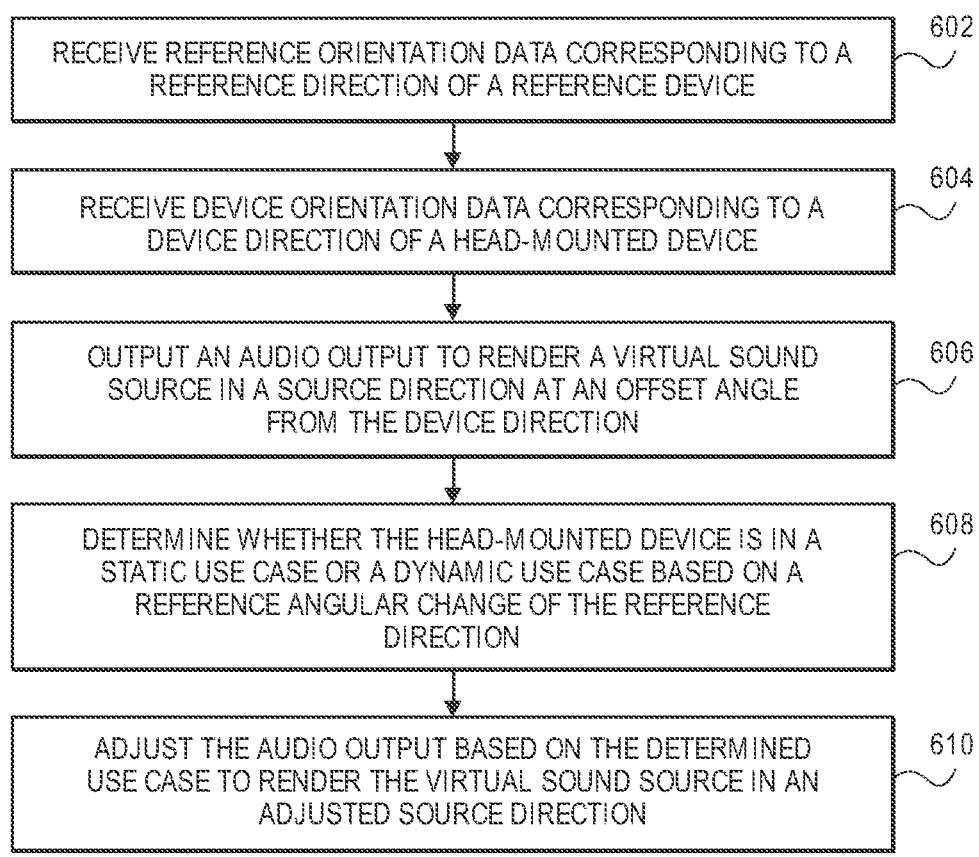
FIG. 6 is a flowchart of a method of using a binaural sound reproduction system to dynamically re-center a frame of reference for a virtual sound source, in accordance with an embodiment.
Figure 7:
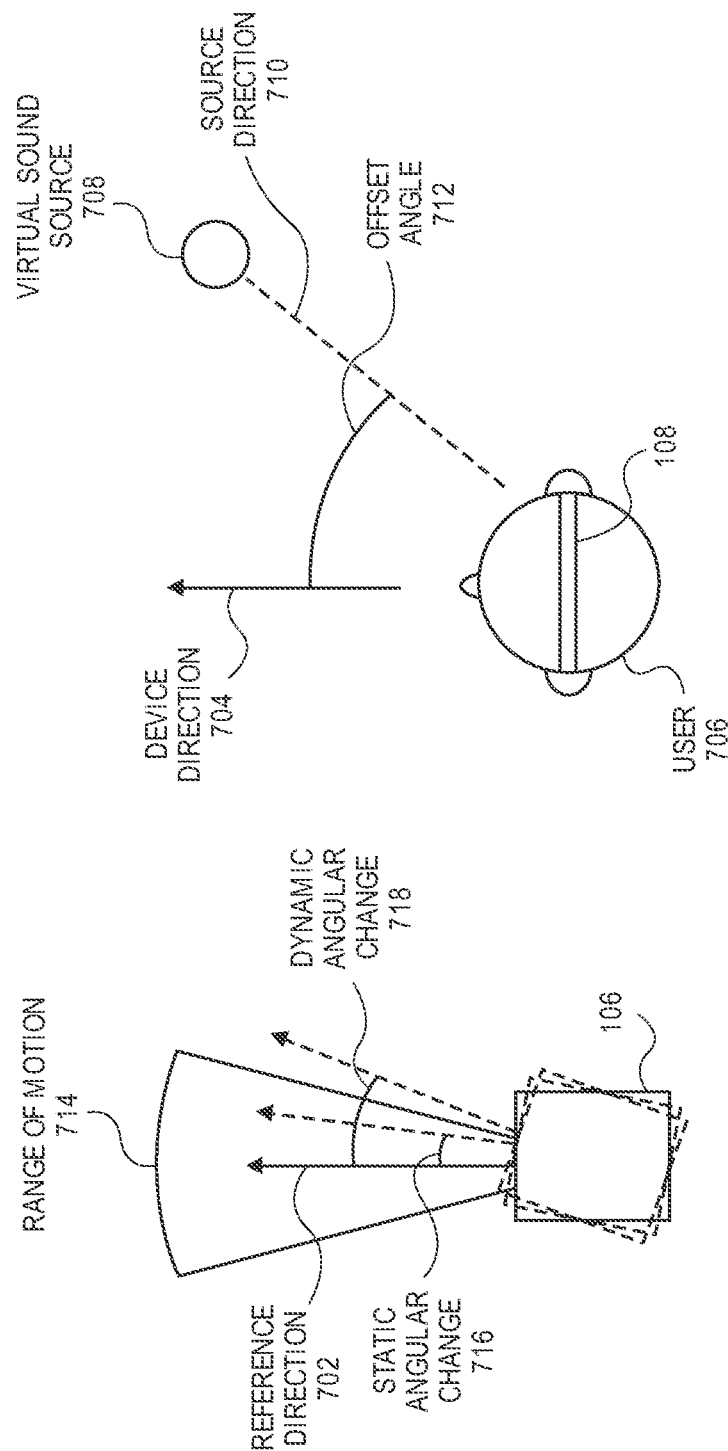
FIG. 7 is a pictorial representation of a binaural sound reproduction system being used in a static or dynamic use case, in accordance with an embodiment.

Referring to FIG. 6, a flowchart of a method of using a binaural sound reproduction system to dynamically re-center a frame of reference for a virtual sound source is shown in accordance with an embodiment. FIG. 7 is a pictorial representation of a binaural sound reproduction system being used during the method of FIG. 6. Accordingly, FIGS. 6 and 7 are described together below.

At operation 602, processors of binaural sound reproduction system 300 may receive reference orientation data 502. Reference orientation data 502 may be output by reference sensor 408 of reference device 106. For example, referring to FIG. 7, reference orientation data 502 may correspond to a reference direction 702 of reference device 106. Reference direction 702 may be established by convention. For example, reference direction 702 may be an output of an IMU or navigation system corresponding to a datum, such as a vector facing forward from a top surface of casing 306. Reference direction 702 need not actually be frontward of user 706, however. That is, the secondary device 106 does not have to be oriented or even know which way an actual forward direction is. Rather, the determinations described throughout this description may be based on relative changes in orientation, and do not necessarily account for an actual forward direction. As such, the term "forward-facing" as used throughout the description is to be interpreted as a relative term, and not necessarily an absolute term accounting for the spatial orientation of user 706.

At operation 604, processors of binaural sound reproduction system 300 may receive device orientation data 504. Device orientation data 504 may be output by device sensor 410 of head-mounted device 108. For example, referring to FIG. 7, device orientation data 504 may correspond to a device direction 704 of head-mounted device 108. Head-mounted device 108, of course, may be worn by a user 706 and thus device direction 704 may correspond to a forward-facing direction of user 706. Accordingly, device direction 704 may change relative to global frame of reference 104 when user 706 turns his head or when local frame of reference 102 within which user 706 is situated moves relative to global frame of reference 104.

At operation 606, head-mounted device 108 provides audio output 302. More particularly, audio processor 412 may generate an electrical audio signal for left speaker 310 and right speaker 312 to render a virtual sound source 708 in a source direction 710. Virtual sound source 708 may be associated with content being played on reference device 106. For example, virtual sound source 708 may be a voice of a participant sitting toward the periphery of user 706 during a video conference call. Accordingly, to accurately represent virtual sound source 708 to user 706, audio output 302 may render virtual sound source 708 at an offset angle 712 from device direction 704 such that the voice is perceived by user 706 as coming from the periphery of his vision.

Local frame of reference 102 may be movable relative to global frame of reference 104. As local frame of reference 102 shifts, reference device 106, which may be fixed relative to local frame of reference 102, may also shift. As reference device 106 rotates, reference direction 702 may experience a reference angular change relative to a datum of global frame of reference 104, e.g., relative to a true north direction. When local frame of reference 102 moves, device direction 704 corresponding to the forward facing direction of user 706 may also move. To accurately represent virtual sound source 708, however, any movement in device direction 704 attributable to movement of the local frame of reference 102 should be compensated for by also shifting source direction 710. That is, when local frame of reference 102 moves relative to global frame of reference 104, the frame of reference of head-mounted device 108 may be re-centered such that virtual sound source 708 continues to come from a direction that user 706 perceives as the periphery of his vision. Such re-centering may occur in response to determining an appropriate re-centering method, i.e., a method based on the use case of head-mounted device 108.

At operation 608, processor(s) 402 and/or audio processor 412 of binaural sound reproduction system 300 may determine whether head-mounted device 108 is in static use case 100 or dynamic use case 200. Such determination may be made based on reference orientation data 502. More particularly, the reference angular change of reference direction 702 may be compared to a predetermined range of motion 714 to assess whether head-mounted device 108 is being used in static use case 100 or dynamic use case 200.

Range of motion 714 may be an angular range, e.g., −20 to 20 degrees, relative to a baseline reference direction of reference device 106. That is, when reference orientation data 502 indicates that reference direction 702 experiences a static reference angular change 716 within range of motion 714, e.g., less than 20 degrees in either direction, audio processor 412 may determine that head-mounted device 108 is in static use case 100. Angular deviations within range of motion 714 may be attributed to natural shifts within a given static environment, e.g., trunk rotation while running on a treadmill, and may be insufficient to change the re-centering method from a manual method to an automatic method as described below.

When reference orientation data 502 indicates that reference direction 702 experiences a dynamic reference angular change 718 outside of the predetermined range of motion 714, e.g., more than 20 degrees in either direction, audio processor 412 may determine that head-mounted device 108 is in dynamic use case 200. Angular deviations outside of range of motion 714 may be attributed to preconceived dynamic environments, e.g., jogging or driving around a corner, and may be sufficient to change the re-centering method from a manual method to an automatic method as described below.

At operation 610, binaural sound reproduction system 300 may adjust audio output 302 based on the determined use case. More particularly, audio processor 412 of head-mounted device 108 may alter electrical audio signals provided to left speaker 310 and right speaker 312 to render virtual sound source 708 in an adjusted source direction. Relocating virtual sound source 708 in the adjusted source direction may be achieved using different methodologies. For example, as described below, virtual sound source 708 may be relocated based on either a manual or an automatic re-centering of local frame of reference 102 associated with head-mounted device 108.

Figure 8:
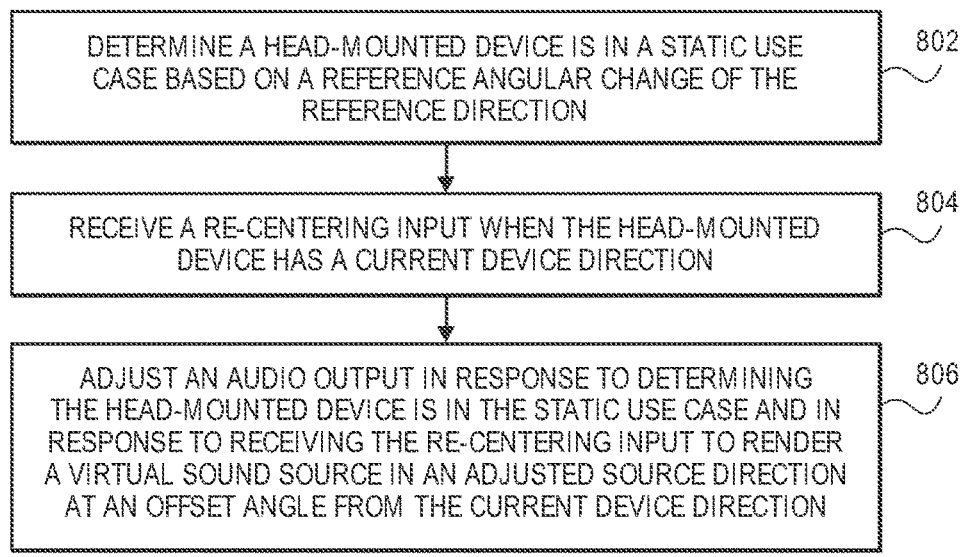
FIG. 8 is a flowchart of a method of using a binaural sound reproduction system to dynamically re-center a frame of reference for a virtual sound source in a static use case, in accordance with an embodiment.

Referring to FIG. 8, a flowchart of a method of using a binaural sound reproduction system to dynamically re-center a frame of reference for a virtual sound source in a static use case is shown in accordance with an embodiment. FIGS.

9A-9C are pictorial views of the binaural sound reproduction system during the method of FIG. 8. Accordingly, FIGS. 8 and 9A-9C are described together below.

At operation 802, one or more processors of binaural sound reproduction system 300 may determine head-mounted device 108 is in static use case 100. Such determination may be based on a reference angular change of reference direction 702 being within range of motion 714, as described above.

When head-mounted device 108 is in static use case 100, the frame of reference of head-mounted device 108 may be re-centered manually. By way of example, local frame of reference 102 as indicated by reference orientation data 502 may remain stationary relative to global frame of reference 104. Nonetheless, user 706 may want to re-center device direction 704 in a new forward facing direction when, for example, user 706 wants to turn in his chair to look out a window while listening to a music reproduction.

Figure 9A:
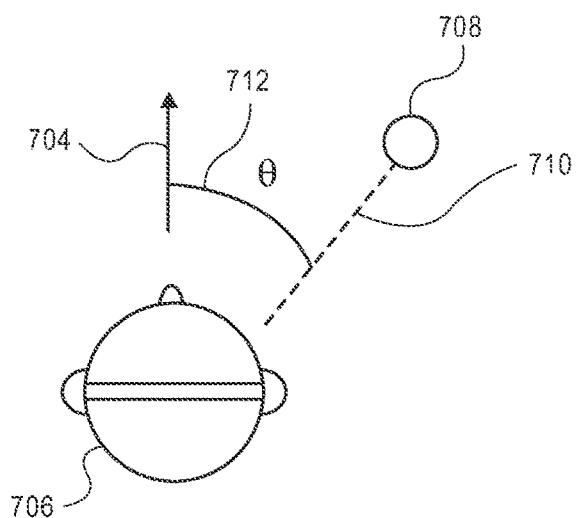
FIGS. 9A-9C are pictorial views of a binaural sound reproduction system in a static use case, in accordance with an embodiment.

Referring to FIG. 9A, user 706 may initially face a first direction such that device direction 704 is forward facing in static use case 100. As described above, virtual sound source 708 may be rendered to be perceived by user 706 as coming from a peripheral direction at offset angle 712 from reference direction 702.

Figure 9B:
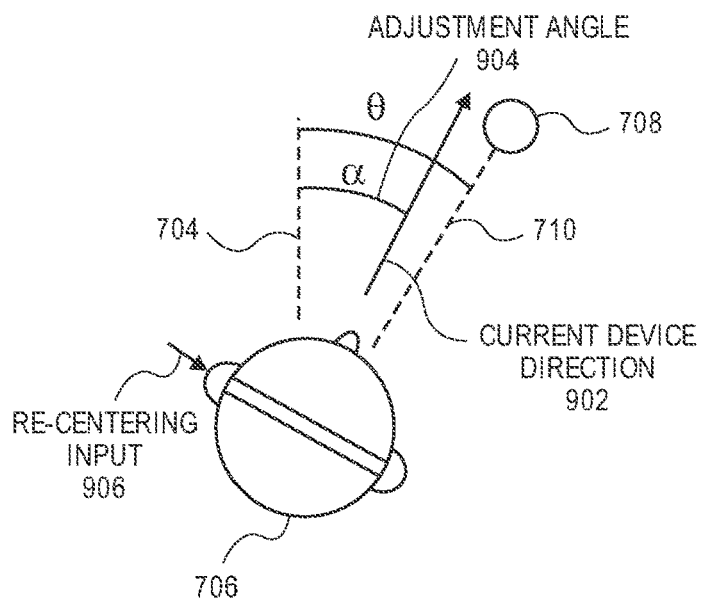

Referring to FIG. 9B, user 706 may swivel his office chair such that a torso and face of user 706 are directed in a second direction offset from the first direction. User 706 may wish for the second direction to be a new forward facing direction. More particularly, the second direction may be a current device direction 902 offset from device direction 704 by an adjustment angle 904. In FIG. 9B, virtual sound source 708 may continue to be rendered in source direction 710 because head-mounted device 108 does not automatically re-center the frame of reference of virtual sound source 708 to adjust for movements of a user's torso in static use case 100. Thus, even though user 706 has shifted his personal frame of reference by rotating his chair, and may expect virtual sound source 708 to shift to match the personal frame of reference, virtual sound source 708 may instead be perceived as coming from nearly the same direction as the user's new gaze.

At operation 804, user 706 may manually override binaural sound reproduction system 300 to re-center the frame of reference of head-mounted device 108 such that virtual sound source 708 shifts to the expected location. Referring to FIG. 9B, a re-centering input 906 may be received by audio processor 412 when head-mounted device 108 has current device direction 902. Re-centering input 906 may be a manual input from user 706. For example, user 706 may actuate re-centering input switch 316 to provide re-centering input 906 to head-mounted device 108. Re-centering input switch 316 may be a voice activated switch actuated by a verbal command issued by user 706. Similarly, re-centering input switch 316 may be a physical button on head-mounted device 108, and user 706 may manually press the physical button to provide re-centering input 906.

Figure 9C:
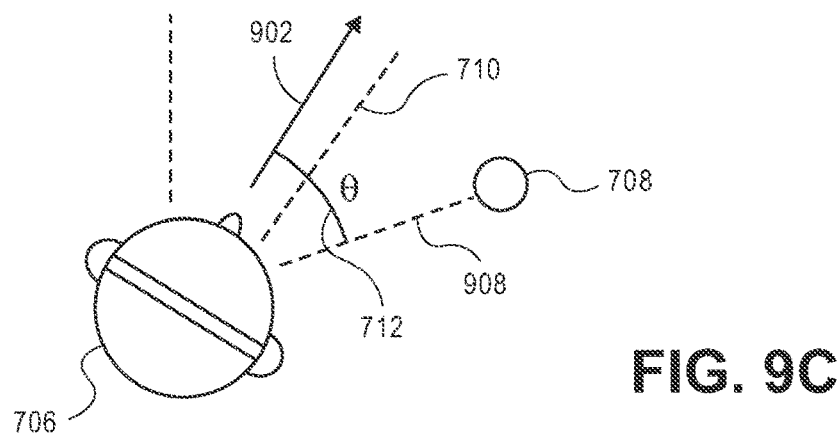

At operation 806, audio output 302 may be adjusted in response to determining head-mounted devices 108 is in static use case 100, and in response to receiving re-centering input 906. For example, audio processor 412 may receive re-centering input 906 from re-centering input switch 316 after determining head-mounted device 108 is in static use case 100, and audio processor 412 may adjust audio output 302 to render virtual sound source 708 in an adjusted source direction. Referring to FIG. 9C, an adjusted source direction 908 may be at offset angle 712 from current device direction 902. Accordingly, user 706 may manually calibrate a zero degree direction of head-mounted device 108 to align with the user's gaze by activating re-centering input switch 316. Thus, virtual sound source 708 will continue to be perceived as coming from the peripheral vision of user 706 after user 706 has swiveled in his chair and manually re-centered the frame of reference of head-mounted device 108.

Figure 10:
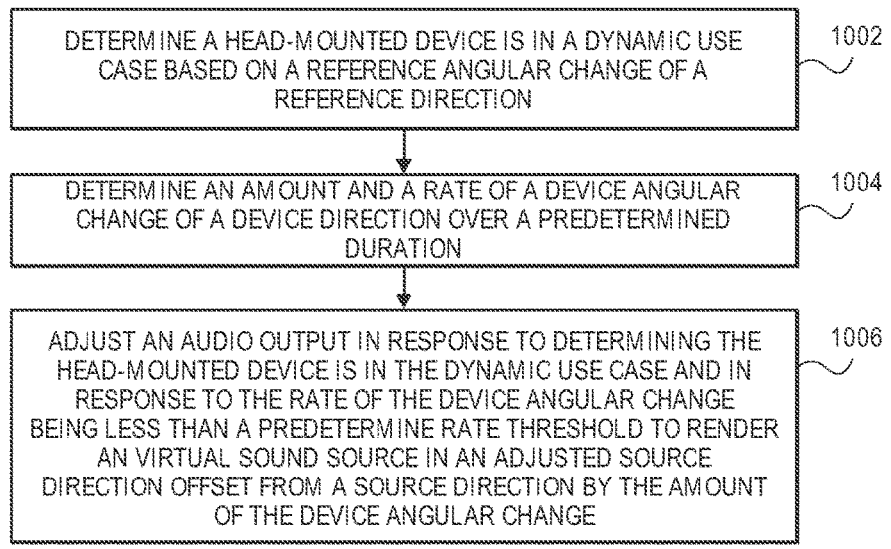
FIG. 10 is a flowchart of a method of using a binaural sound reproduction system to dynamically re-center a frame of reference for a virtual sound source in a dynamic use case, in accordance with an embodiment.

Referring to FIG. 10, a flowchart of a method of using a binaural sound reproduction system to dynamically re-center a frame of reference for a virtual sound source in a dynamic use case is shown in accordance with an embodiment. An understanding of method illustrated in FIG. 10 is facilitated with reference to FIGS. 11, 12, and 13A-13C, and accordingly, those figures are described in combination below.

At operation 1002, one or more processors of binaural sound reproduction system 300 may determine head-mounted device 108 is in dynamic use case 200. Such determination may be based on a reference angular change of reference direction 702 being outside of range of motion 714, as described above.

When head-mounted device 108 is in dynamic use case 200, the frame of reference of head-mounted device 108 may be re-centered automatically. By way of example, when local frame of reference 102 as indicated by reference orientation data 502 moves relative to global frame of reference 104, binaural sound reproduction system 300 may re-center device direction 704 in a new forward facing direction. Accordingly, virtual sound source 708 may be shifted to remain fixed within the moving local frame of reference 102 as perceived by the moving user 706. In an embodiment, a manner of automatically shifting virtual sound source 708 may depend on an amount and/or a rate of the device angular change.

Figure 11:
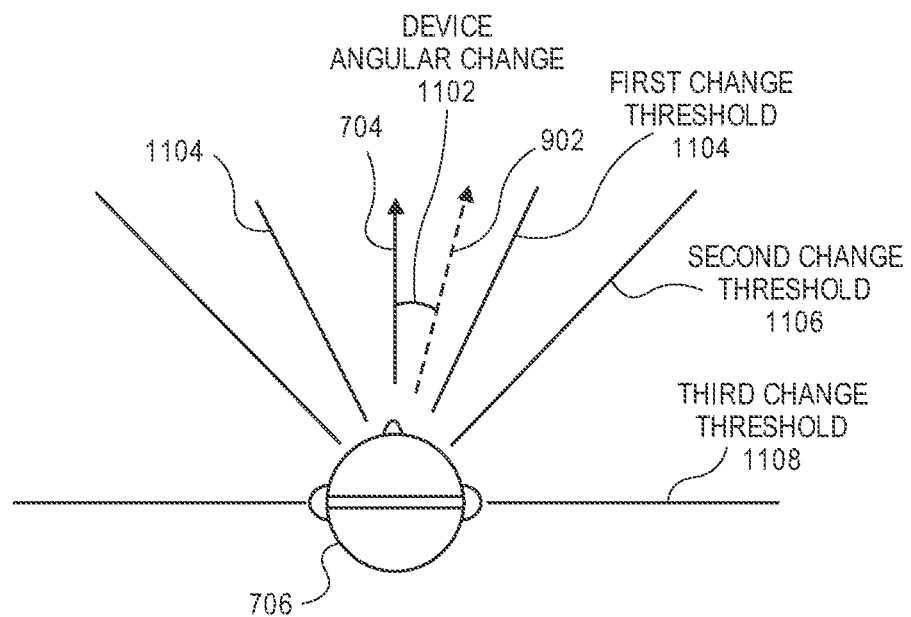
FIG. 11 is a pictorial view of a binaural sound reproduction system in a dynamic use case, in accordance with an embodiment.

Referring to FIG. 11, a pictorial view of a binaural sound reproduction system in a dynamic use case is shown in accordance with an embodiment. At operation 1004, an amount and a rate of an angular change of device direction 704 is determined. A device angular change 1102 may be measured as an angular distance between an initial device direction 704 and a current device direction 902 after user's head has moved in dynamic use case 200. For example, device angular change 1102 may be 90 degrees when user 706 jogs around a corner and shifts the forward facing direction from device direction 704 pointing along one street to current device direction 902 pointing along an orthogonal street.

In an embodiment, the amount of device angular change 1102 may be within different ranges of movement. For example, the device direction of the head-mounted device 108 may move from an initial device direction 704 to a current device direction over an angle within a range of movement, and the range of movement may be one of several ranges of movement offset from the initial device direction by at least a predetermined angular change threshold, e.g., first angular change threshold 1104. The amount of device angular change 1102 may be more than first angular change threshold 1104. Small head motions made by user 706 while head-mounted devices 108 is in dynamic use case 200 may not require the virtual sound source 708 to be shifted. First angular change threshold 1104 may correspond to the predetermined range encompassing small head motions and glances that should not cause virtual sound source 708 to jump. By contrast, it may be desirable to shift virtual sound source 708 more when head-mounted device 108 experiences larger device angular changes 1102. Thus, device angular changes 1102 may be further compartmentalized into ranges of movement. A first range of movement may encompass the range of movement between first angular change threshold 1104 and a second angular change threshold 1106. A second range of movement may encompass the range of movement between second angular change threshold 1106 and a third angular change threshold 1108. A third range of movement may encompass the range of movement beyond third angular change threshold 1108.

Audio processor 412 may determine whether the amount of device angular change 1102 is less than a second predetermined angular change threshold 1106, more than second angular change threshold 1106 and less than a third angular change threshold 1108, or more than third angular change threshold 1108. Audio processor 412 may determine that the device direction of the head-mounted device has moved from the initial device direction 704 to a current device direction within the first range of movement when the device direction is between first angular change threshold 1104 and second angular change threshold 1106. Audio processor 412 may determine that the device direction of the head-mounted device has moved from the initial device direction 704 to a current device direction within the second range of movement when the device direction is between second angular change threshold 1106 and third angular change threshold 1108, and so on. Re-centering may occur based on the angular change that current device direction 902 falls within. That is, audio processor 412 may adjust audio output based on the range of movement of the device direction to render the virtual sound source in an adjusted source direction offset from the source direction by the angle 1102 traversed by the head-mounted device.

Figure 12:
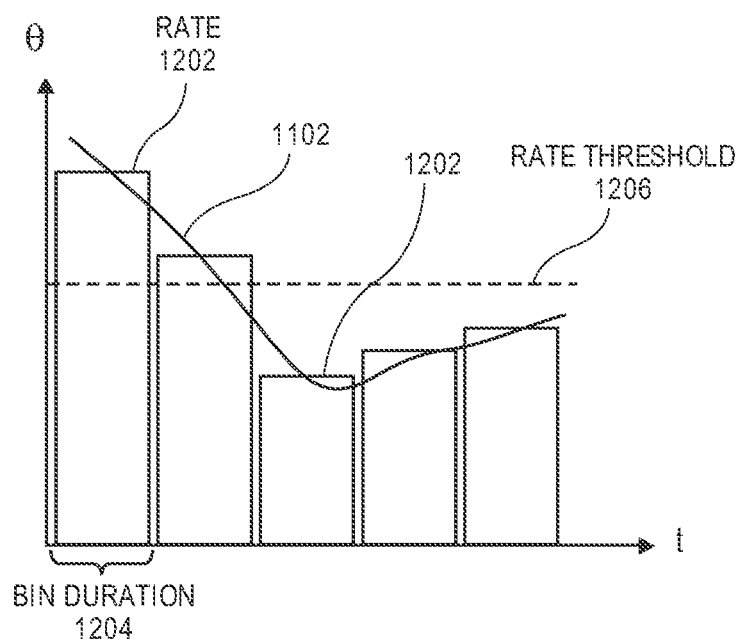
FIG. 12 is a graphical view of an angular change of a head-mounted device of a binaural sound reproduction system in a dynamic use case, in accordance with an embodiment.

Referring to FIG. 12, a graphical view of an angular change of a head-mounted device of a binaural sound reproduction system in a dynamic use case is shown in accordance with an embodiment. In an embodiment, audio processor 412 may determine a rate of the device angular change in response to the amount of the device angular change 1102 being greater than first predetermined angular change threshold 1104. For example, audio processor 412 may determine a rate of device angular change when the device direction moves within the first range of movement between thresholds 1104, 1106, or the second range of movement between thresholds 1106, 1108. When movements of head-mounted device 108 are in a small range, virtual sound source 708 may remain fixed relative to an existing frame of reference of head-mounted device 108, however, when movements of head-mounted device 108 exceed first angular change threshold 1104, audio processor 412 may begin to assess when and where to shift virtual sound source 708. Such an assessment may be made based on a rate 1202 of device angular change within the range of movement.

The rate of device angular change may be analyzed in terms of angle versus time. In an embodiment, a rate 1202 of device angular change corresponds to the amount of device angular change per unit of time. The rate of device angular change may be an amount of device angular change over a bin duration. For example, the analyzed time range may be divided into individual bins, and each bin may have a bin duration 1204. Accordingly, audio processor 412 may determine rate 1202 of device angular change 1102 over predetermined bin duration 1204. Rate 1202 may be a median rate of change of the device direction when the device direction is within the given range of movement. For example, when bin duration 1204 is set at 100 ms, a median rate of change of the device direction may be measured over each 100 ms time window.

In an embodiment, bin duration 1204 is based on the amount of device angular change 1102. For example, bin duration 1204 may correspond to the range of movement within which the head-mounted device is currently directed and/or moving. Bin duration 1204 may be a first duration, e.g., 100 ms, when the amount of device angular change 1102 is greater than first angular change threshold 1104 and less than second angular change threshold 1106. Bin duration 1204 may be a second duration different than the first duration when the amount of device angular change 1102 is more than second angular change threshold 1106. For example, when the amount of device angular change 1102 is between second angular change threshold 1106 and third angular change threshold 1108, bin duration 1204 may be a different value, e.g., 25 ms. When the amount of device angular change 1102 is greater than third angular change threshold 1108, bin duration 1204 may be another value, e.g., 5 ms. Thus, a length of bin duration 1204 may be inversely correlated to an amount of device angular change 1102. That is, the second bin duration associated with angular changes greater than second angular change threshold 1106 (within the second range of movement) may be less than the first bin duration associated with angular changes less than second angular change threshold 1106 (within the first range of movement).

At operation 1006, audio processor 412 may adjust audio output 302 in response to rate 1202 of device angular change being less than a predetermined rate threshold 1206. Referring again to FIG. 12, variance between individual bins may be compared to rate threshold 1206. For example, the median rates of change of device direction 704 may be analyzed to determine whether rate 1202 has decreased to a point at which it is safe to assume that user 706 is now looking in a direction that is a new forward facing direction. It will be appreciated that rates 1202 of change occurring during extreme movements, e.g., jogging or driving around a corner, may be higher than rates of change occurring while user 706 is gazing in a forward direction. Accordingly, by altering bin duration 1204 inversely with the amount of device angular change 1102 appropriate smaller time windows may be analyzed to determine whether user 706 has turned to face a new forward facing direction. That is, big turns may receive nearly immediate shifts of virtual sound source 708, while smaller turns may shift virtual sound source 708 more gradually. As a result, adjustments to source direction 710 of virtual sound source 708 may match movements of user 706 more naturally.

Figure 13A:
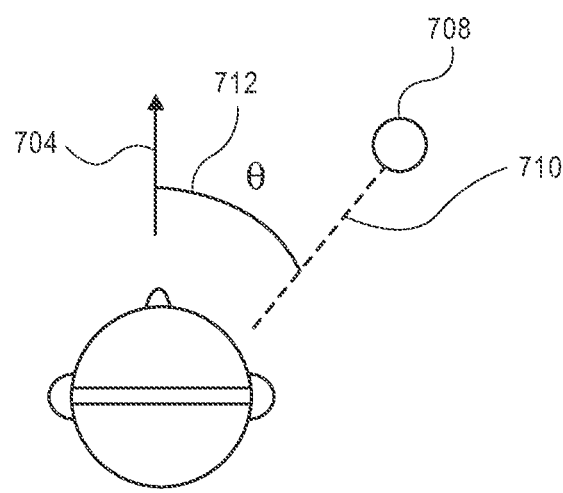
FIGS. 13A-13C are pictorial views of a binaural sound reproduction system in a dynamic use case, in accordance with an embodiment.
Figure 13B:
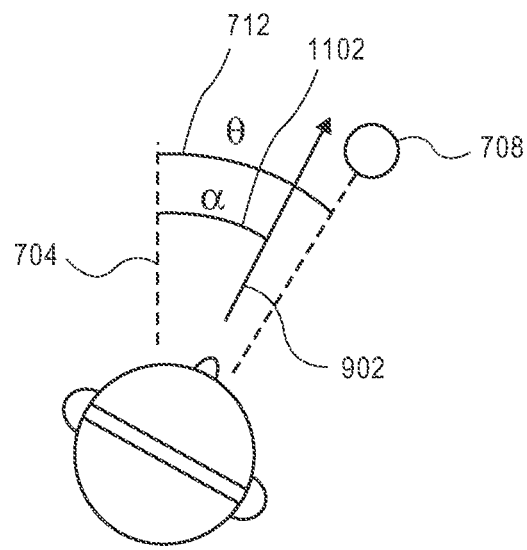
Figure 13C:
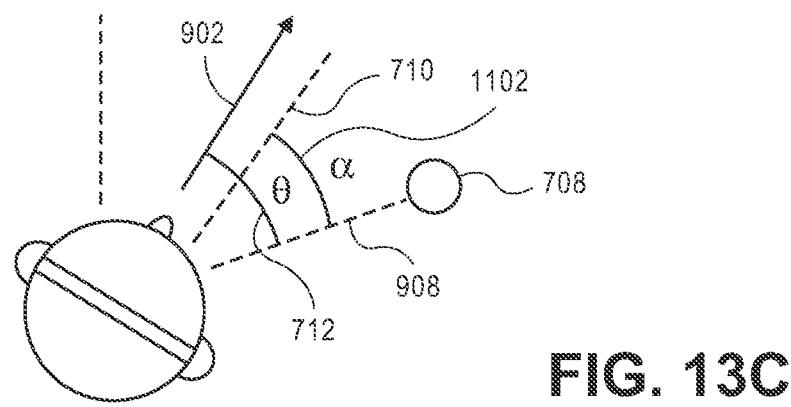

FIGS. 13A-13C are pictorial views of the binaural sound reproduction system during the method of FIG. 10. Referring to FIG. 13A, head-mounted device 108 may be facing reference direction 702 in dynamic use case 200 while audio output 302 renders virtual sound source 708 in source direction 710. As described above, source direction 710 may be at an offset angle 712 from device direction 704. Referring to FIG. 13B, user 706 may shift device direction 704 to current device direction 902 by walking around a corner. More particularly, device direction 704 may experience device angular change 1102. The amount of device angular change 1102 may be greater than first angular change threshold 1104, indicating to head-mounted device 108 that audio output 302 should be adjusted to relocate virtual sound source 708. Referring to FIG. 13C, in response to head-mounted device 108 being in dynamic use case 200, and in response to rate 1202 of device angular change 1102 being less than predetermined rate threshold 1206 as described above, audio processor 412 may adjust audio output 302 to render virtual sound source 708 in an adjusted source direction 908. The angular shift may be equal to device angular change 1102. That is, after determining that the device angular change 1102 is a result of user 706 changing to a desired forward facing direction, virtual sound source 708 may be shifted by the amount of device angular change 1102 to maintain the perception of virtual sound source 708 being at a same offset angle 712 from current device direction 902.

The methods described throughout this description do not necessarily require the determination of static use case 100 or dynamic use case 200 by reference device 106 to be useful for head-tracking during binaural sound reproduction. For example, one or more of the methods may be performed without making an initial determination as to whether binaural sound reproduction system is being used in a dynamic case. That is, binaural sound reproduction system 300 may be presumed to be in dynamic use case 200 (or static use case 100), and audio output 302 may be adjusted accordingly.

In an embodiment, head-tracking for binaural sound reproduction includes a method similar to the method of FIG. 10. Operation 1002 may, however, be omitted. More particularly, audio output may be continuously updated according to operations 1004 and 1006 without making a determination as to whether the head-mounted device 108 is in dynamic use case 200. As such, adjustments to audio output may be based on the operations illustrated in FIGS. 11-12 to effect the audio adjustments shown in FIGS. 13A-13C without making an initial determination according to operation 1002. Accordingly, time-based head-tracking may be performed for binaural sound reproduction using a dynamic time factor that continuously determines an appropriate source direction 710 (or 908). This is pointed out to clarify that any of the described methods may be practiced with fewer operations than are described, and in fact, operations from different methods of binaural sound reproduction may be combined within the scope of this description. Accordingly, the described methods are illustrative, and not restrictive.

Figure 14:
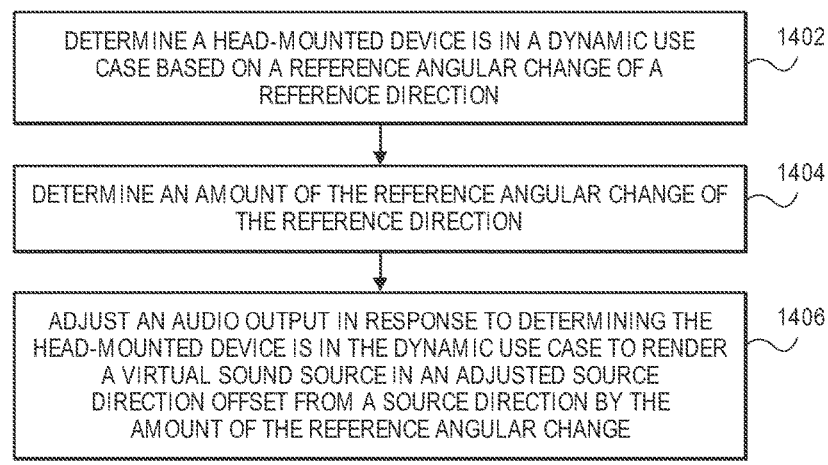
FIG. 14 is a flowchart of a method of using a binaural sound reproduction system to dynamically re-center a frame of reference for a virtual sound source in a dynamic use case, in accordance with an embodiment.
Figure 15A:
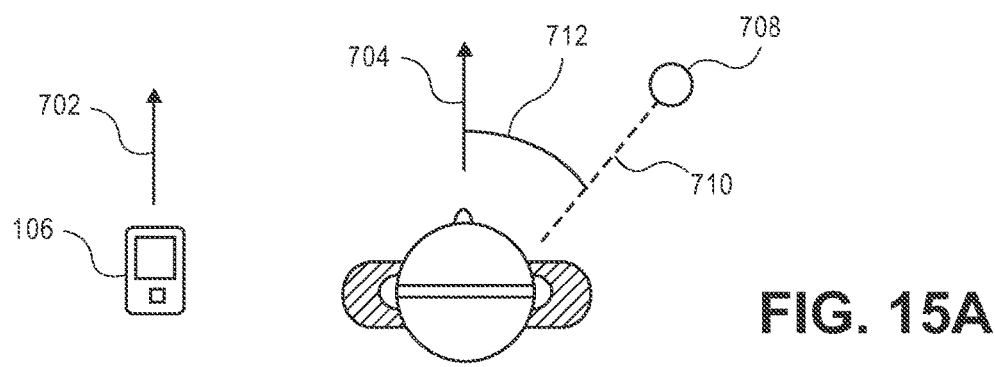
FIGS. 15A-15C are pictorial views of a binaural sound reproduction system in a dynamic use case, in accordance with an embodiment.
Figure 15B:
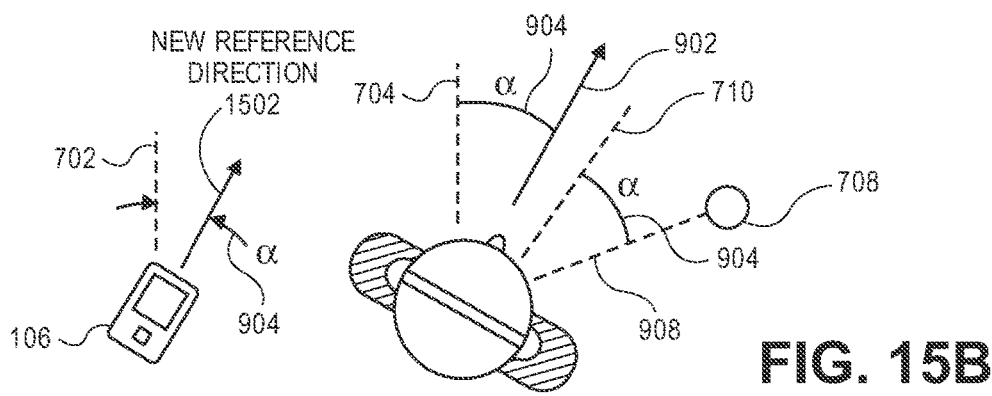
Figure 15C:
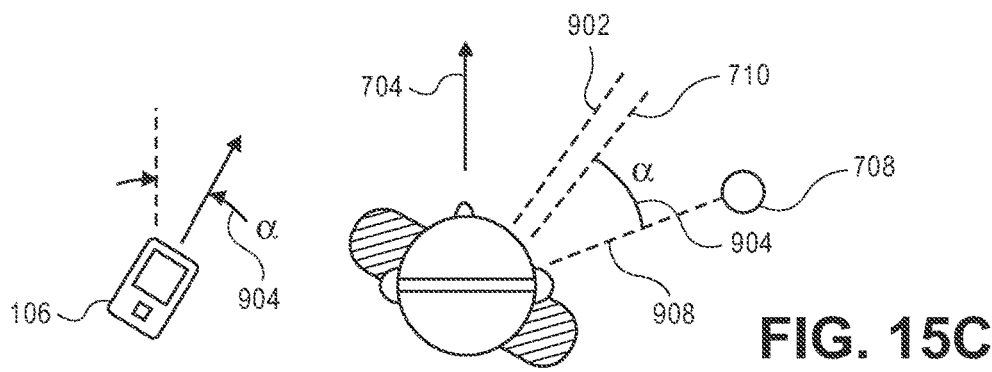

Referring to FIG. 14, a flowchart of a method of using a binaural sound reproduction system to dynamically re-center a frame of reference for a virtual sound source in a dynamic use case is shown in accordance with an embodiment. FIGS. 15A-15C are pictorial views of the binaural sound reproduction system during the method of FIG. 14. Accordingly, FIGS. 14 and 15A-15C are described together below.

Referring to FIG. 15A, head-mounted device 108 may be facing reference direction 702 in dynamic use case 200 while audio output 302 renders virtual sound source 708 in source direction 710. As described above, source direction 710 may be at an offset angle 712 from device direction 704.

At operation 1402, one or more processors of binaural sound reproduction system 300 may determine head-mounted device 108 is in dynamic use case 200. Such determination may be based on a reference angular change of reference direction 702 being outside of range of motion 714, as described above.

When head-mounted device 108 is in dynamic use case 200, the frame of reference of head-mounted device 108 may be re-centered automatically. By way of example, when local frame of reference 102 as indicated by reference orientation data 502 moves relative to global frame of reference 104, binaural sound reproduction system 300 may re-center device direction 704 in a new forward facing direction. Accordingly, virtual sound source 708 may be automatically shifted to remain fixed within the moving local frame of reference 102 as perceived by the moving user 706. In an embodiment, a manner of automatically shifting virtual sound source 708 may include coordination between reference orientation data 502 from reference device 106 and device orientation data 504 from head-mounted device 108.

Referring to FIG. 15B, reference device 106 may experience a reference angular change causing reference direction 702 to shift from the initial reference direction 702 to a new reference direction 1502. The new reference direction 1502 may be offset from reference direction 702 by an adjustment angle 904. In an embodiment, the change in reference direction 702 may also occur in device direction 704. For example, when reference device 106 and user 706 are both situated in a moving vehicle, both reference device 106 and head-mounted device 108 will experience the same angular change when the vehicle turns around the corner. Accordingly, device direction 704 may rotate by adjustment angle 904 to current device direction 902.

At operation 1404, audio processor 412 may determine the amount of reference angular change of reference direction 702. More particularly, when reference direction 702 rotates by adjustment angle 904, audio processor 412 may determine that the amount of reference angular change is equal to adjustment angle 904.

At operation 1406, audio processor 412 may adjust audio output 302 based on the amount of reference angular change. More particularly, audio output 302 may be adjusted in response to determining head-mounted device 108 is in dynamic use case 200 to render virtual sound source 708 in an adjusted source direction 908 offset from the original source direction 710. The amount of adjustment may be the same as the reference angular change. Accordingly, virtual sound source 708 may shift in coordination with angular shifts of reference device 106. That is, when reference device 106 rotates by an amount, virtual sound source 708 may be shifted by the same amount. As a result, virtual sound source 708 may be automatically shifted to remain fixed within the moving local frame of reference 102 as perceived by the moving user 706.

Referring to FIG. 15C, the automatic re-centering of the frame of reference of head-mounted device 108 relative to local frame of reference 102 associated with reference device 106 may allow the frame of reference of virtual sound source 708 to shift based on movements of reference device 106 and not movements of head-mounted device 108. More particularly, after virtual sound source 708 is shifted to adjusted source direction 908, user 706 may rotate his head without affecting a location of virtual sound source 708 relative to local frame of reference 102. Virtual sound source 708 may be rendered differently, however, when user 706 turns his head. For example, when user 706 turns his head to change device direction 704 from current device direction 902 back to initial device direction 704, virtual sound source 708 may continue to be perceived as coming from adjusted source direction 908, which may now be at a larger angle from device direction 704 than before.

It will be appreciated that the re-centering operations described above may be combined into hybrid embodiments. For example, a tuning method to control how often a component of binaural sound reproduction system 300 updates a direction may be applied to reference device 106. Such a tuning method may be similar to the methods described above with respect to FIG. 10. For example, referring again to FIG. 15B, the amount of reference angular change may be compared to angular change thresholds similar to those described with respect to FIG. 11. In an embodiment, a rate of reference angular change may be determined in response to the amount of reference angular change being greater than a predetermined angular change threshold, e.g., greater than a first angular change threshold as applied to movement of reference device 106. The rate of reference angular change may be determined over a predetermined duration. That is, the rate of reference angular change may be determined in a manner similar to the determination of rate 1202 as described with respect to FIG. 12. Accordingly, referring again to operation 1406 of FIG. 14, the adjustment of audio output 302 may be made further in response to the rate of reference angular change being less than a respective predetermined rate threshold. Such a methodology is similar to the method used to dynamically re-center head-mounted device 108 based on a look direction of the user 706. It will be appreciated that the application of such a smoothing method to the dynamic re-centering method of FIG. 14 may provide another benefit. Namely, applying the smoothing algorithm to reference device 106 allows binaural sound reproduction system 300 to accurately and smoothly locate new reference direction 1502 to allow virtual sound source 708 to then be shifted by an appropriate adjustment angle 904.

As described above, sensor inputs to binaural sound reproduction system 300 may be classified into different use cases. If binaural sound reproduction system 300 determines a dynamic use case 200, re-centering will be used according to one of the methods described above. To illustrate an application of binaural sound reproduction system 300, one may consider the case of user 706 watching a movie on an airplane. User 706 may watch the movie using binaural sound reproduction system 300. For example, reference device 106 may be a tablet computer and display 308 may present video content to user 706. Head-mounted device 108 may be a pair of headphones having sound calibrated so that dialogue from the video content is perceived as coming from the forward facing direction, i.e., display 308, while surround content is perceived as coming from behind user 706. As user 706 moves his head, e.g., to gaze out a window of the airplane, the dialogue will continue to be perceived as coming from the forward facing direction of the tablet computer. One will appreciate that, if the airplane yaws, without the aid of a dynamic re-centering function, a head tracker would detect the rotation of the airplane as a turn of the user's head, and thus, the dialogue and the surround content would be rotated incorrectly. Using the dynamic re-centering operations described above, however, binaural sound reproduction system 300 may differentiate between the user's head motion and the frame of reference (airplane) movement, and may compensate to ensure that the dialogue and the surround content is correctly rendered.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method, comprising:
   receiving device orientation data corresponding to a device direction of a head-mounted device within an environment, wherein the head-mounted device is on a user;
   causing the head-mounted device to output an audio output to render a virtual sound source at a first location within a global frame of reference in a source direction at an offset angle from the device direction;
   receiving reference orientation data corresponding to a reference direction of a reference device within the environment, wherein the reference device is not on the user;
   determining whether the environment is moving relative to the global frame of reference based on the reference orientation data indicating that the reference direction of the reference device has moved over a rotation angle; and
   adjusting, in response to determining that the environment is moving relative to the global frame of reference regardless of whether the user is moving within the environment, the audio output of the head-mounted device to shift the source direction of the virtual sound source by the rotation angle of the reference device to render the virtual sound source at a second location within the global frame of reference in an adjusted source direction at the offset angle from the device direction.

2. The method of claim 1, wherein the environment is determined to not be moving when the rotation angle is within a predetermined range of motion, and wherein the environment is determined to be moving when the rotation angle is outside of the predetermined range of motion.

3. The method of claim 2 further comprising receiving a re-centering input;
   wherein adjusting the audio output includes rendering, in response to determining the environment is not moving and in response to receiving the re-centering input, the virtual sound source at the second location in the adjusted source direction at the offset angle from the device direction.

4. The method of claim 3, wherein the re-centering input includes a manual input from a user.

5. The method of claim 2 further comprising:
   determining an amount of a device angular change of the device direction; and
   determining, in response to the amount of the device angular change being greater than a first predetermined angular change threshold, a rate of the device angular change over a predetermined duration;
   wherein adjusting the audio output includes rendering, in response to determining the environment is moving and in response to the rate of the device angular change being less than a predetermined rate threshold, the virtual sound source at the second location in the adjusted source direction offset from the device direction by the offset angle.

6. The method of claim 5, wherein the predetermined duration is based on the amount of the device angular change, wherein the predetermined duration is a first duration when the amount of the device angular change is less than a second predetermined angular change threshold, wherein the predetermined duration is a second duration when the amount of the device angular change is more than the second predetermined angular change threshold, and wherein the second duration is less than the first duration.

7. The method of claim 2 further comprising determining the rotation angle of the reference direction.

8. The method of claim 7 further comprising determining, in response to the rotation angle being greater than a predetermined angular change threshold, a rate of angular change of the reference direction over a predetermined duration;

wherein adjusting the audio output is in response to the rate of angular change being less than a predetermined rate threshold.

9. A binaural sound reproduction system, comprising:
a head-mounted device including a device sensor to output device orientation data corresponding to a device direction of the head-mounted device within an environment, wherein the head-mounted device is on a user;
a reference device having a reference sensor to output reference orientation data corresponding to a reference direction of the reference device within the environment, wherein the reference device is not on the user; and
an audio processor configured to
output an audio output to render a virtual sound source at a first location within a global frame of reference in a source direction at an offset angle from the device direction,
determine whether the environment is moving relative to the global frame of reference based on the reference orientation data indicating that the reference direction of the reference device has moved over a rotation angle, and
adjust, in response to determining that the environment is moving relative to the global frame of reference regardless of whether the user is moving within the environment, the audio output of the head-mounted device to shift the source direction of the virtual sound source by the rotation angle of the reference device to render the virtual sound source at a second location within the global frame of reference in an adjusted source direction at the offset angle from the device direction.

10. The binaural sound reproduction system of claim 9, wherein the audio processor is further configured to
determine that the environment is not moving when the rotation angle is within a predetermined range of motion, and
determine that the environment is moving when the rotation angle is outside of the predetermined range of motion.

11. The binaural sound reproduction system of claim 10, wherein the head-mounted device further includes a re-centering input switch to receive a re-centering input from a user, and wherein the audio processor is further configured to
receive the re-centering input from the re-centering input switch, and
adjust the audio output, in response to receiving the re-centering input, to render the virtual sound source at the second location in the adjusted source direction at the offset angle from the device direction.

12. The binaural sound reproduction system of claim 11, wherein the re-centering input switch is a physical button to receive a manual press by the user.

13. The binaural sound reproduction system of claim 10, wherein the audio processor is further configured to:
determine an amount of a device angular change of the device direction; and
determine, in response to the amount of the device angular change being greater than a first predetermined angular change threshold, a rate of the device angular change over a predetermined duration;
wherein the audio processor adjusts the audio output in response to determining the environment is moving and in response to the rate of the device angular change being less than a predetermined rate threshold to render the virtual sound source at the second location in the adjusted source direction offset from the device direction by the offset angle.

14. The binaural sound reproduction system of claim 13, wherein the predetermined duration is based on the amount of the device angular change, wherein the predetermined duration is a first duration when the amount of the device angular change is less than a second predetermined angular change threshold, wherein the predetermined duration is a second duration when the amount of the device angular change is more than the second predetermined angular change threshold, and wherein the second duration is less than the first duration.

15. The binaural sound reproduction system of claim 10, wherein the audio processor is further configured to determine the rotation angle of the reference direction.

16. The binaural sound reproduction system of claim 15 wherein the audio processor is further configured to determine, in response to the rotation angle being greater than a predetermined angular change threshold, a rate of angular change of the reference direction over a predetermined duration;
wherein the audio processor adjusts the audio output in response to the rate of the reference angular change being less than a predetermined rate threshold.

17. A non-transitory machine-readable medium having instructions, which when executed by a processor of a binaural sound reproduction system, causes the binaural sound reproduction system to perform a method, comprising:
receiving device orientation data corresponding to a device direction of a head-mounted device within an environment, wherein the head-mounted device is on a user;
causing the head-mounted device to output an audio output to render a virtual sound source at a first location within a global frame of reference in a source direction at an offset angle from the device direction;
receiving reference orientation data corresponding to a reference direction of a reference device within the environment, wherein the reference device is not on the user;
determining whether the environment is moving relative to the global frame of reference based on whether the reference orientation data indicates that the reference direction of the reference device has moved over a rotation angle within a predetermined range of motion; and
adjusting, in response to determining that the environment is moving relative to the global frame of reference regardless of whether the user is moving within the environment, the audio output of the head-mounted device to shift the virtual sound source by the rotation angle of the reference device to render the virtual sound source at a second location within the global frame of reference in an adjusted source direction at the offset angle from the device direction.

18. The non-transitory machine-readable medium of claim 17 having further instructions to cause the binaural sound reproduction system to perform the method further comprising receiving a re-centering input;
wherein adjusting the audio output includes rendering, in response to determining the environment is not moving and in response to receiving the re-centering input, the virtual sound source at the second location in the adjusted source direction at the offset angle from the device direction.

19. The non-transitory machine-readable medium of claim 17 having further instructions to cause the binaural sound reproduction system to perform the method further comprising:
- determining an amount of a device angular change of the device direction; and
- determining, in response to the amount of the device angular change being greater than a first predetermined angular change threshold, a rate of the device angular change over a predetermined duration;
- wherein adjusting the audio output includes rendering, in response to determining the environment is moving and in response to the rate of the device angular change being less than a predetermined rate threshold, the virtual sound source at the second location in the adjusted source direction offset from the device direction by the offset angle.

20. The non-transitory machine-readable medium of claim 17 having further instructions to cause the binaural sound reproduction system to perform the method further comprising determining the rotation angle of the reference direction.

* * * * *